(12) United States Patent
Spink

(10) Patent No.: US 6,884,980 B2
(45) Date of Patent: Apr. 26, 2005

(54) METHOD AND APPARATUS FOR AUTOMATIC FOCUSING OF AN OPTICAL DEVICE

(75) Inventor: Roger Spink, Berneck (CH)

(73) Assignee: Leica Microsystems AG, Heerbrugg (CH)

(*) Notice: Subject to any disclaimer, the term of this patent is extended or adjusted under 35 U.S.C. 154(b) by 296 days.

(21) Appl. No.: 10/073,171

(22) Filed: Feb. 13, 2002

(65) Prior Publication Data

US 2002/0109071 A1 Aug. 15, 2002

(30) Foreign Application Priority Data

Feb. 14, 2001 (DE) .......................................... 101 06 698

(51) Int. Cl.[7] .................. G02B 27/40; G02B 27/64; G02B 7/04
(52) U.S. Cl. .................. 250/201.3; 250/201.2; 250/201.8; 359/368; 359/379; 359/392
(58) Field of Search .................. 250/201.2, 201.3, 250/201.8, 208.1; 359/368, 382, 383, 392, 379

(56) References Cited

U.S. PATENT DOCUMENTS

| | | | | |
|---|---|---|---|---|
| 3,721,827 A | | 3/1973 | Reinheimer ................ 250/201 |
| 5,239,170 A | * | 8/1993 | Hughlett .................. 250/201.3 |
| 5,647,025 A | * | 7/1997 | Frost et al. .................. 382/255 |
| 5,783,814 A | * | 7/1998 | Fairley et al. ........... 250/201.3 |
| 5,790,710 A | * | 8/1998 | Price et al. .................. 382/255 |
| 6,172,349 B1 | * | 1/2001 | Katz et al. ................ 250/201.3 |
| 6,580,062 B1 | * | 6/2003 | Baer ........................ 250/201.2 |
| 2003/0142398 A1 | * | 7/2003 | Leblans ...................... 359/383 |
| 2003/0164440 A1 | * | 9/2003 | Czarnetzki et al. ....... 250/201.3 |

FOREIGN PATENT DOCUMENTS

| | | |
|---|---|---|
| DE | 1 928 432 | 12/1969 |
| DE | 2 053 017 | 5/1972 |
| DE | 2 102 922 | 9/1972 |
| GB | 1 260 245 | 1/1972 |

* cited by examiner

Primary Examiner—David Porta
Assistant Examiner—Davienne Monbleau
(74) Attorney, Agent, or Firm—Foley & Lardner LLP

(57) ABSTRACT

The invention concerns a method and an apparatus for automatically focusing an optical device onto a specific and predetermined region of a specimen. The apparatus compares signals corresponding to the vertical distance between a principal objective and a region of a specimen which is in focus to the vertical distance between the principal objective and a target region on the specimen. If the comparison of the distances indicates that they are not the same, the system automatically alters the distance between the specimen and the principal objective so that the target region is properly focused.

29 Claims, 7 Drawing Sheets

| Y\X | -5 | -4 | -3 | -2 | -1 | 0 | 1 | 2 | 3 | 4 | 5 | 6 | 7 | 8 | 9 | 10 | 11 |
|---|---|---|---|---|---|---|---|---|---|---|---|---|---|---|---|---|---|
| -4 |   |   |   |   |   |   |   |   |   |   |   |   |   |   |   |   |   |
| -3 |   |   |   |   |   |   |   |   |   |   | 1 | 1 |   |   |   |   |   |
| -2 |   |   |   |   |   |   |   |   |   | 1 | 1 |   |   |   |   |   |   |
| -1 |   |   |   |   |   |   |   | 1 | 1 | 1 |   |   |   |   |   |   |   |
| 0  |   |   |   |   |   |   | 1 | 1 | 1 |   |   |   |   |   |   |   |   |
| 1  |   |   |   |   | 1 | 1 |   | 1 |   |   |   |   |   |   |   |   |   |
| 2  |   |   |   | 1 | 1 |   |   | 1 | 1 |   |   |   |   |   |   |   |   |
| 3  |   |   |   |   | 1 |   |   | 1 | 1 | 2 | 1 | 1 |   |   |   |   |   |
| 4  |   |   |   |   | 1 |   | 1 | 2 | 2 | 1 | 4 | 1 |   | 1 | 1 | 1 |   |
| 5  |   |   |   |   | 1 | 1 | 1 | 1 | 1 | 2 | 2 | 1 | 1 |   | 1 |   |   |
| 6  |   |   |   |   | 1 | 1 |   | 1 |   | 1 | 1 |   |   |   |   | 1 |   |
| 7  |   |   |   |   |   |   |   | 1 |   |   |   |   |   |   |   | 1 |   |
| 8  |   |   |   |   |   |   |   | 1 | 1 |   |   |   |   |   |   | 1 |   |
| 9  |   |   |   |   |   |   |   |   |   | 1 | 1 | 1 | 1 | 1 | 1 |   |   |
| 10 |   |   |   |   |   |   |   |   |   |   |   |   |   |   |   |   |   |

FIG. 4

METHOD AND APPARATUS FOR AUTOMATIC FOCUSING OF AN OPTICAL DEVICE

CROSS REFERENCE TO RELATED APPLICATIONS

This invention claims priority of German Patent Application DE 101 06 698.8, the entirety of which is incorporated herein by reference.

BACKGROUND OF THE INVENTION

1. Field of the Invention

The invention concerns a method and an apparatus for automatically focusing an optical device such as, for example, a surgical stereomicroscope, with which it is possible to focus on the specimen plane which requires the greatest visual acuity.

2. Description of the Related Art

In many applications, especially clinical ones, work is performed in only a small region of a field of view. Moreover, the image content in the small environment in which work is being performed exhibits the greatest changes as a result of movement of the instrument on which the work is being performed. Therefore, as a viewer needs the greatest focal sharpness at precisely where work is being performed, focusing should be performed specifically in this region.

In addition to manual adjustment of the focal plane of an optical device, there are many automatic systems that perform a focal adjustment based on a measurement signal which, in turn, is generated substantially based on a measurement of the distance to the specimen. If the X and Y coordinate axes lie in a plane common to specimen plane, and the Z coordinate axis extends parallel to the optical axis (and perpendicular to the X and Y axes), the X and Y coordinates must be defined in order to ascertain a distance from the optical system to a point in the specimen plane. In simple systems, these coordinates are defined as $X_0=Y_0=0$. In more complex systems, the coordinates to be defined ($X_0$, $Y_0$) are designated by means of a joystick. Complex systems can ascertain, for example by "eye tracking," the coordinates ($X_0$, $Y_0$) of a point being viewed by the observer's eye. In addition, the complex measurement system can ascertain the vertical spacing between that point ($X_0$, $Y_0$) and the objective, i.e. $Z_0$. DE-A-1 928 432, Commissariat à l'Energie Atomique, Paris, which is incorporated herein by reference, describes adapting the $Z_0$ coordinate, based on the change in brightness of the image rays (as the focus setting).

In addition, German Documents DE-A-2 053 017 and DE-B-2 102 922, both of which are incorporated herein by reference, respectively, describe: (a) compensating for a slit image using displaceable mirrors; and (b) an invisible ray bundle with a photoelectric device.

The inventor has recognized that the known systems are disadvantageous in the following respects: (a) a manual or electric focusing system is slow, and diverts the viewer from his or her task or activity; (b) the existing autofocus systems focus on a specific preselected region ($X_0$, $Y_0$) which must be deliberately modified (with manual or electric activation); (c) "eye tracking" devices are: (i) technically complex; (ii) require additional equipment to track the user's eye; and (iii) limit the field of view of assistants, who are observing via a reflected beam path, to the direction of view of the principal observer; and (d) all known methods ignore the use of instruments by the user, or in some circumstances are interfered with thereby.

For these and other reasons, a new apparatus and method are needed for automatically focusing a target region of a specimen.

SUMMARY OF THE INVENTION

A first aspect of the invention involves a method for autofocusing the objective of an optical device onto a target region of a specimen. The method includes: (a) positioning the specimen defining a plurality of regions in an image field of the optical device; (b) determining the frequency movements for each of the plurality of regions of the specimen; (c) defining as the target region the region among the plurality of regions of the specimen which exhibits a predetermined frequency movements value; (d) determining the vertical distance $Z_1$ between the objective and the target region; (e) generating a first signal corresponding to the calculated distance $Z_1$; (f) inputting the first signal into an autofocus system unit connected to a focusing device; (g) activating the focusing device, in response to the first signal; and (h) focusing automatically the objective using the focusing device.

The method may also include: (i) analyzing an image corresponding to the specimen for the evaluation of a first optically detectable specimen-related change. Moreover, this change may be categorized such as, for example, into categories corresponding to fast and slow changes, changes in brightness, and occurrence of reflections. Moreover, multiple changes may be analyzed and categorized.

The target region in the aforementioned method may correspond to a region in the specimen which exhibits the greatest frequency movements per unit time. Similarly, if multiple changes are analyzed, one of the regions corresponding to the changes can be defined as the target region.

The method may also include, between steps (f) and (g): (f)(1) determining the vertical distance between the objective and a region on the specimen on which the objective is focused, said distance defining a second vertical distance; (f)(2) generating a second signal corresponding to the second vertical distance; (f)(3) inputting the second signal corresponding to the second vertical distance into the autofocus system unit; and (f)(4) comparing the second signal to the first signal to determine whether the second vertical distance is equal to the calculated vertical distance $Z_1$. In addition, if the calculated vertical distance $Z_1$ and the second vertical distance are not equal, the method may further include: (f)(5) subtracting the calculated vertical distance $Z_1$ from the second vertical distance to define a difference. In addition, if the difference is positive, the step (h) may include increasing the distance between the specimen and the objective. Similarly, if the difference is negative, the step (h) may include decreasing the distance between the specimen and the objective.

The aforementioned method may be adapted to include (i) identifying objects moving within the image field. It should also be noted that the step (b) may include the steps of: (b)(1) resolving each of the plurality of regions of the specimen into a corresponding pixel having an X and Y coordinate; (b)(2) generating, using an image sensor, first electrical signals corresponding to each of the pixels; and (b)(3) using the first electrical signals corresponding to the pixels to generate a first image representation of the specimen. Moreover, the first electrical signals corresponding to the pixels may be video signals. In addition, step (b) may also include: (b)(4) generating, using the image sensor, second electrical signals corresponding to each of the pixels; (b)(5) using the second electrical signals corresponding to the pixels to generate a second image representation of the specimen; and (b)(6) comparing, for each pixel, the second electrical signal to the first electrical signal to define the frequency movements of the region of the specimen corresponding to the pixel. Further, step (b) may additionally include: (b)(7) displaying the frequency movements of each of the pixels in a visual output which may be a three-dimensional histogram having X, Y, and Z coordinates which correspond to the X and Y coordinates of the pixels, respectively, and wherein the Z coordinate of the histogram corresponds to the frequency movements at each of the pixels. In addition, the pixel having the greatest frequency movements may be set as the target region.

The invention also addresses an apparatus for automatically focusing an optical system. The apparatus includes an image sensor analysis unit; an autofocus system unit; a focusing device; and a displaceable objective. In this apparatus, the objective is adapted to be automatically moved vertically in response to a signal corresponding to a vertical height between a target region of a specimen and a reference point. The image sensor analysis unit is adapted to send a signal to the autofocus system unit corresponding to the vertical height of the target region. The autofocus system unit is adapted to measure a focus height. The autofocus system unit is adapted to compare the focus height to the vertical height between the target region and the reference point and yield an output corresponding to said comparison. In addition, the focusing device is adapted to move the objective vertically in response to the output of the autofocus system unit.

In the previously described apparatus, the image sensor analysis unit may be a computer. Moreover, if the image sensor is a computer it may be adapted to detect changes in electrical signals corresponding to distinct regions of the specimen and the computer may be further adapted to analyze the changes.

These and other features, aspects, and advantages of the present invention will become more apparent from the following description, appended claims, and accompanying exemplary embodiments shown in the drawings.

BRIEF DESCRIPTION OF THE DRAWINGS

The accompanying drawings, which are incorporated in and constitute a part of the specification, illustrate embodiments of the invention and together with the description, serve to explain the principles of the invention.

FIG. 4 shows a representation of the histogram of FIG. 3 in two-dimensional form;

DETAILED DESCRIPTION OF THE PREFERRED EMBODIMENTS

Figure 1:
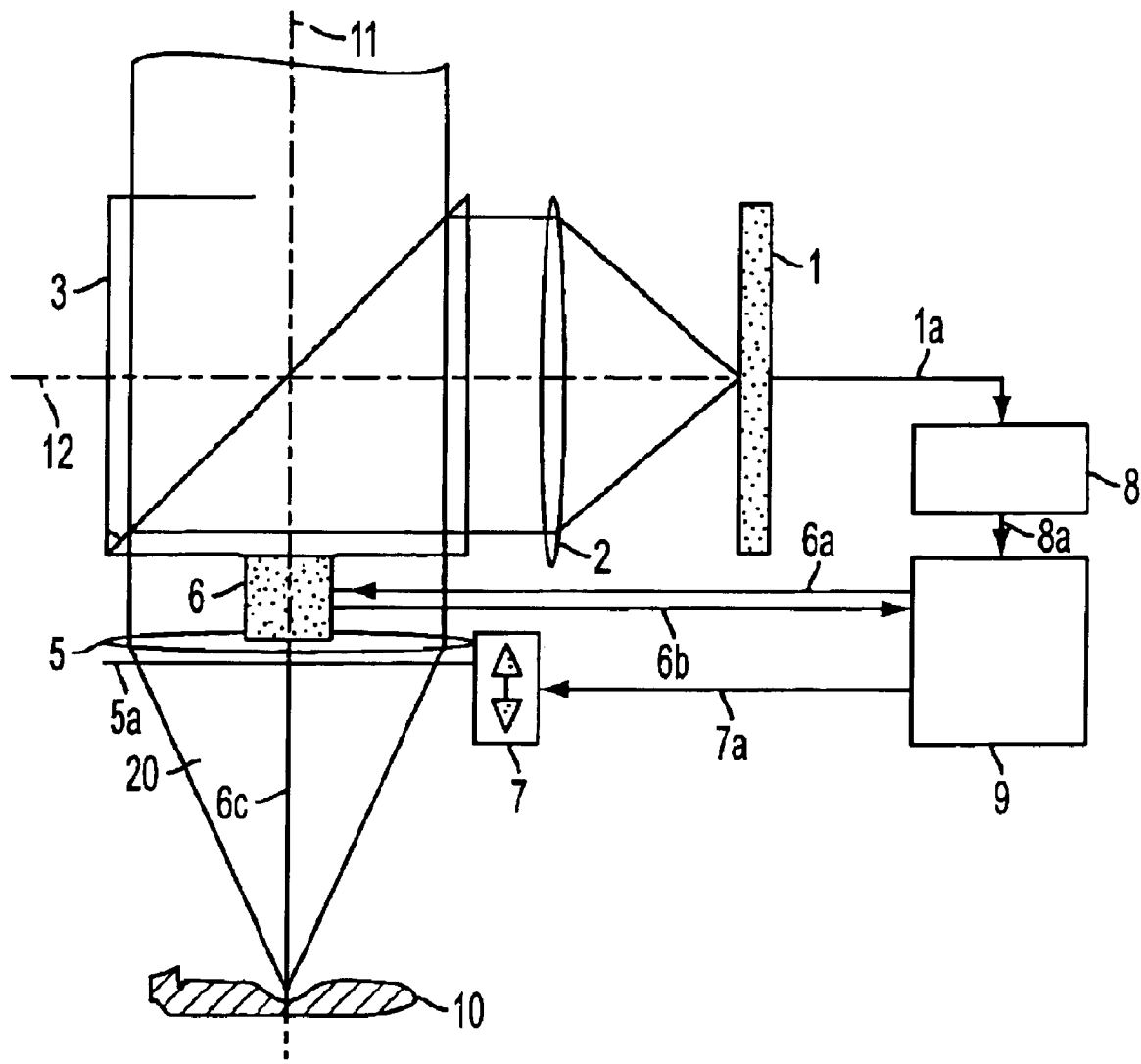
FIG. 1 shows an exemplary configuration of an image sensor analysis unit according to the present invention and an image sensor of a camera having an imaging optical system.

Reference will now be made in detail to the present preferred embodiments of the invention, examples of which are illustrated in the drawings. Wherever possible, the same reference numbers will be used throughout the drawings to refer to the same or like parts.

FIG. 1 shows an exemplary configuration of an image sensor analysis unit 8 according to the present invention. Preferably, the image sensor analysis unit 8 is a computer. Also shown in FIG. 1 is an image sensor 1 which may be, for example, a CCD of a camera. Further, the image sensor 1 includes an imaging optical system 2, such as a lens, that acts in conjunction with a beam splitter 3.

The beam splitter 3 is positioned so that a portion of a ray bundle 20 emitted by a specimen 10 having a non-planar surface is directed to pass therethrough along a transmission axis 11. Between the beam splitter 3 and the specimen 10, there is positioned a principal objective 5 of an optical device which may be, for example, a microscope. After the portion of the ray bundle 20 passes through the principal objective 5 and enters to the beam splitter 3, the beam splitter 3 divides the ray bundle portion 20 into two separate beams. A first of the beams is directed so that some of the rays from the specimen 10 may go to one receptacle which, if the optical device is a microscope, is preferably an eyepiece. The second of the beams is directed to the image sensor 1 via a focal axis 12.

The image sensor 1 creates an electronically resolved image of the specimen 10 and transmits it, by means of a first signal 1a (e.g., video signal), to the image sensor analysis unit 8 for further processing. The image may be defined by a plurality of pixels each of which corresponds to a particular coordinate in the specimen 10. Moreover, each of the first signals 1a may correspond to a particular coordinate. These first signals 1a are converted in the image sensor analysis unit 8 into second signals 8a (the details of which are hereafter described) which are sent to an autofocus system unit 9. Using the second signals 8a in conjunction with distance signals 6a and 6b received from a central point 6 in a plane 5a of the principal objective 5, the autofocus system unit 9 activates a focusing device 7 and regulates the position of the principal objective 5, as later described in detail.

Figure 3:
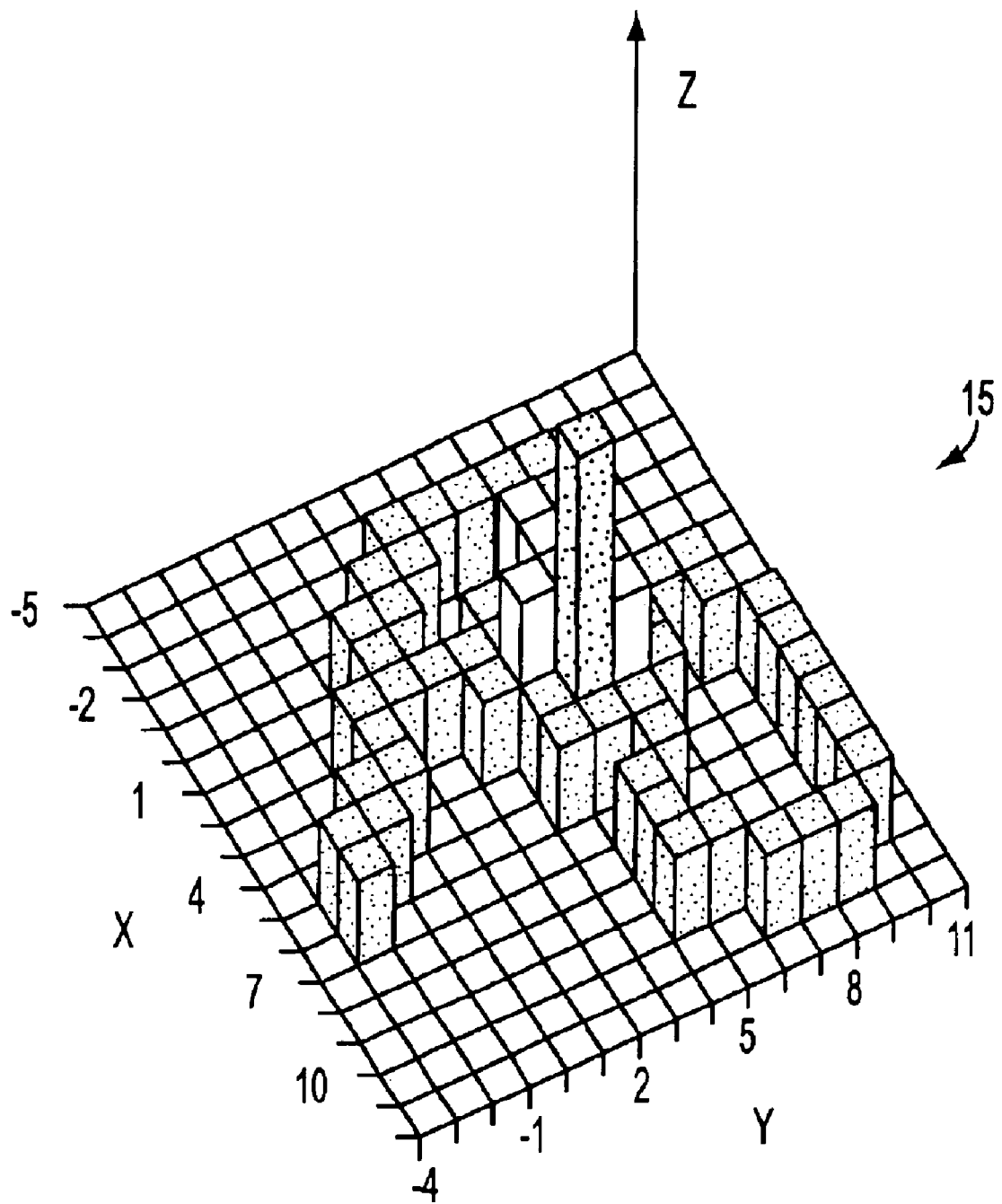
FIG. 3 shows the evaluation of the frequency movements of the instrument tip in the form of a histogram.

The image sensor analysis unit 8 may, by means of suitable programs, internally represent the number of image changes (also referred to as "frequency movements") at a particular X–Y coordinate in the specimen 10 corresponding to the number of times an instrument's tip contacts that coordinate, as later explained. The frequency movements are recorded at specific image points on the specimen 10 in the form of a histogram 15 (FIG. 3). The X–Y plane of the three-dimensional histogram 15 corresponds to the specimen's X and Y coordinates. The Z axis of the histogram 15 represents the frequency movements at a specific point in the X–Y plane. According to the present invention, a specific target region 10a of the histogram, for example the maximum, is ascertained computationally and the X and Y coordinates $(X_1, Y_1)$ associated therewith are determined.

The X and Y coordinates $(X_1, Y_1)$ of the target region 10a are sent to an autofocus system unit 9 by way of the second signal 8a. The central point 6 of the plane 5a of the principal objective 5 (i.e., the origin of a measurement beam) is defined to be (0, 0, 0). The autofocus system unit 9 determines, for example, by way of the measurement beam (shown in FIGS. 1 and 7), the distance 6c between the determined point $(X_1, Y_1, Z_1)$ and the central point 6. The effective vertical distance $Z_1$ between the determined specimen point $(X_1, Y_1, Z_1)$ and the plane 5a of principal objective 5 can be determined by simple triangulation, as explained below. Next, the autofocus system unit 9 similarly determines the vertical distance between a point (X', Y', Z') on which the optical device is focused and the determined point ($X_1$, $Y_1$, $Z_1$). On the basis of this determination, the principal objective 5 can be vertically moved by means of focusing unit 7 into that position in which the determined specimen point ($X_1$, $Y_1$, $Z_1$) is sharply imaged for the viewer.

Figure 7:
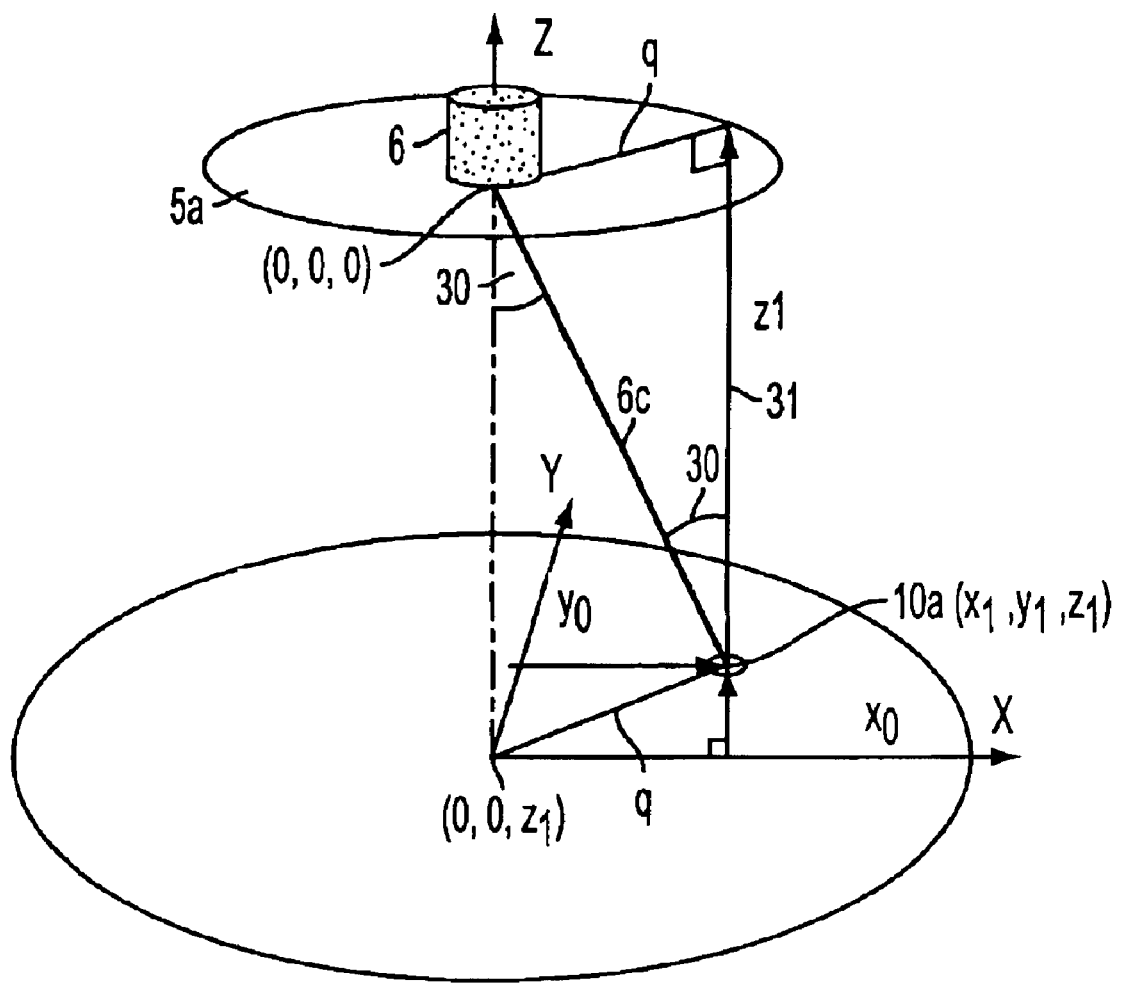
FIG. 7 explains the geometry of the specimen coordinates.

FIG. 7 explains the geometry of the specimen coordinates. The determined specimen point 10a possesses a coordinate ($X_1$, $Y_1$, $Z_1$) in the specimen space. The point (0, 0, 0) is defined as the central point 6 in the reference plane 5a of the principal objective 5 (i.e., the point from which the measurement beam 6c originates). The X and Y coordinates ($X_1$ and $Y_1$) are ascertained on the basis of the previously described image analysis. The effective distance $Z_1$ to the reference plane 5a of principal objective 5 can be ascertained by means of distance measurement, e.g. by simple triangulation, as hereafter explained.

$$q^2 = X_1^2 + Y_1^2$$

$$Z_1 = \text{square root}(6c^2 - q^2)$$

$$Z_1 = \text{square root}(6c^2 - (X_1^2 + Y_1^2))$$

The invention is not limited, however, to a method with a measurement beam 6c. The definitive determination of the focal distance $Z_1$ to the corresponding calculated specimen point ($X_1$, $Y_1$, $Z_1$) can also be made with other conventional methods, for example split image, edge definition analysis, etc. For example, the height $Z_1$ could also be determined with respect to an angle 30 which is defined between a line normal to the plane of the specimen 10 and a line from the principal objective 5 to the calculated point ($X_1$, $Y_1$, $Z_1$). As $Z_1$ is parallel to the normal line, the angle 30 is shown in two places in FIG. 7 which are equiangular. Similarly, due to the parallel nature of the plane 5a of the principal objective 5 and the plane on which the specimen 10 is located, the distance q is shown in two places. Therefore, $Z_1$ can be calculated as follows:

$$q^2 = X_1^2 + Y_1^2$$

$$q = \text{square root}(X_1^2 + Y_1^2)$$

$$\tan(\text{angle } 30) = q/Z_1$$

$$Z_1 = q/(\tan(\text{angle } 30))$$

$$Z_1 = \text{square root}(X_1^2 + Y_1^2)/(\tan(\text{angle } 30))$$

After the height $Z_1$ is calculated (and a signal corresponding thereto is sent to the autofocus system unit 9), the vertical distance between the principal objective 5 and the region 10a on the specimen 10 which is in focus is determined, thereby defining a second vertical distance. A signal 6b corresponding to the vertical distance between the principal objective 5 and the region in focus is then sent to the autofocus system unit 9. The autofocus system unit determines the difference between the signal corresponding to $Z_1$ and the signal 6b corresponding to the distance between the principal objective 5 and the region in focus, the former being subtracted from the latter. If the difference is positive, the autofocus system unit 9 instructs (via a signal 7a) the focusing device 7 to increase the distance between the specimen 10 and the principal objective 5, this usually occurs by lowering a stage on which the specimen 10 exists; the specific increase in distance will depend on the magnitude of the difference. Similarly, if the difference is negative, the autofocus system unit 9 instructs (via a signal 7a) the focusing device 7 to decrease the distance between the specimen 10 and the principal objective 5, this usually occurs by raising a stage on which the specimen 10 exists; the specific decrease in distance will again depend on the magnitude of the difference.

Figure 2:
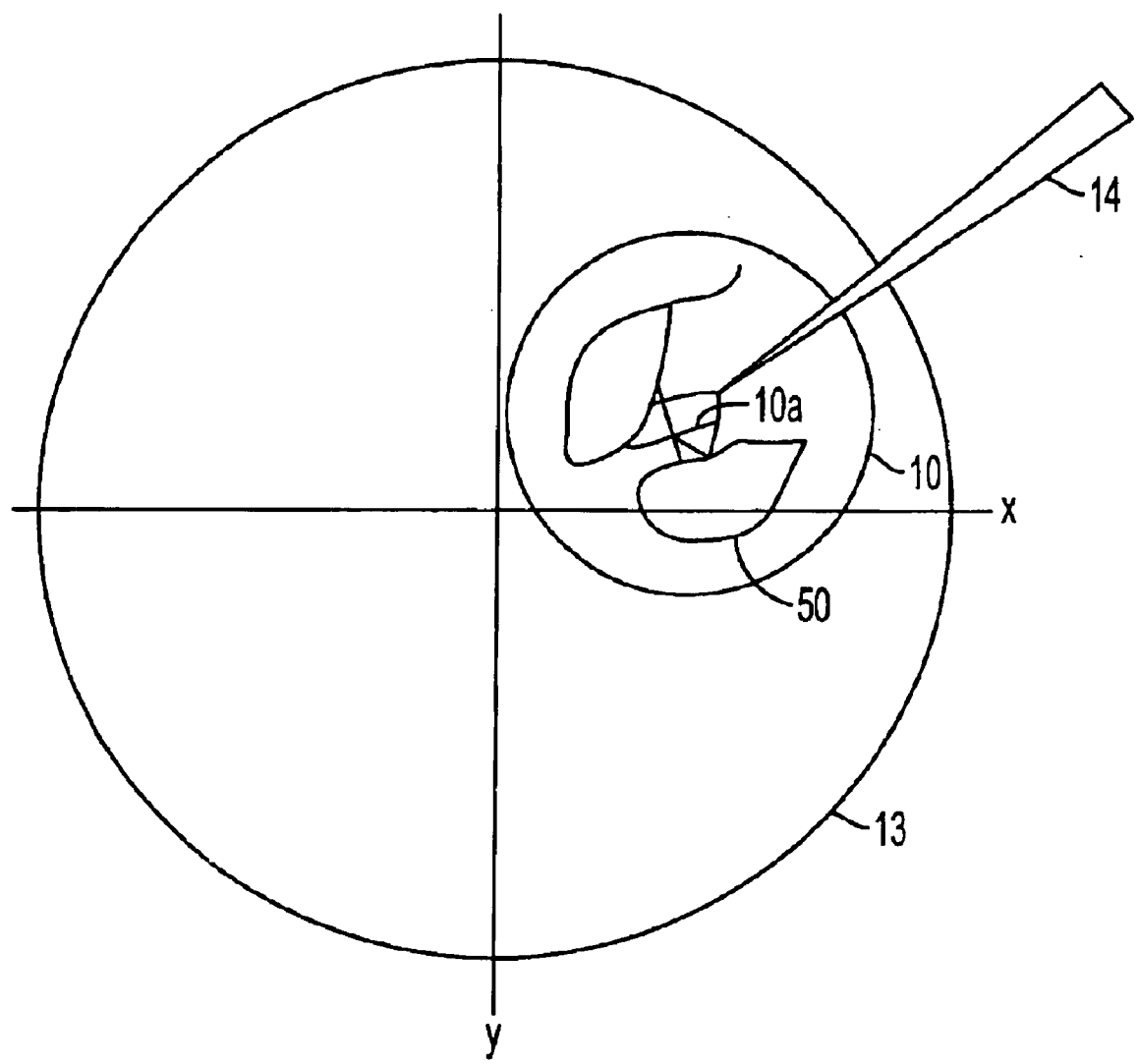
FIG. 2 shows a specimen as it appears upon looking through the eyepiece of a microscope, the specimen having a pointing instrument in contact therewith.

FIG. 2 shows the image of a specimen 10 as it appears, for example, in a view field 13 upon looking through the eyepiece of a microscope. A similar representation of the specimen 10 will also be made on image sensor 1. A surgical instrument 14 performs activities on specimen 10 that result in a change in the position of the instrument's tip; this movement sequence is depicted symbolically by the line(s) 50 drawn in the specimen 10. FIG. 3 shows a 3-dimensional evaluation of the frequency movements of the instrument's tip in the form of a histogram 15. The X–Y coordinates of the histogram 15 correspond to the specimen's X–Y coordinates; the Z axis of the histogram corresponds to the frequency movements in the respective image field. Similarly, FIG. 4 shows a two-dimensional evaluation of the histogram 15 of FIG. 3 in which the number of times the instrument's tip contacts a particular X–Y coordinate in the specimen 10 is represented by showing the numeral corresponding to that number of contact in that X–Y coordinate. For example, as the coordinate (X=−2, Y=2) in FIG. 2 was contacted by the instrument's tip one time, the numeral "1" appears in that X–Y coordinate. By way of a further example, as the coordinate (X=4, Y=4) was contacted four times, the numeral "4" appears in that X–Y coordinate.

Figure 5:
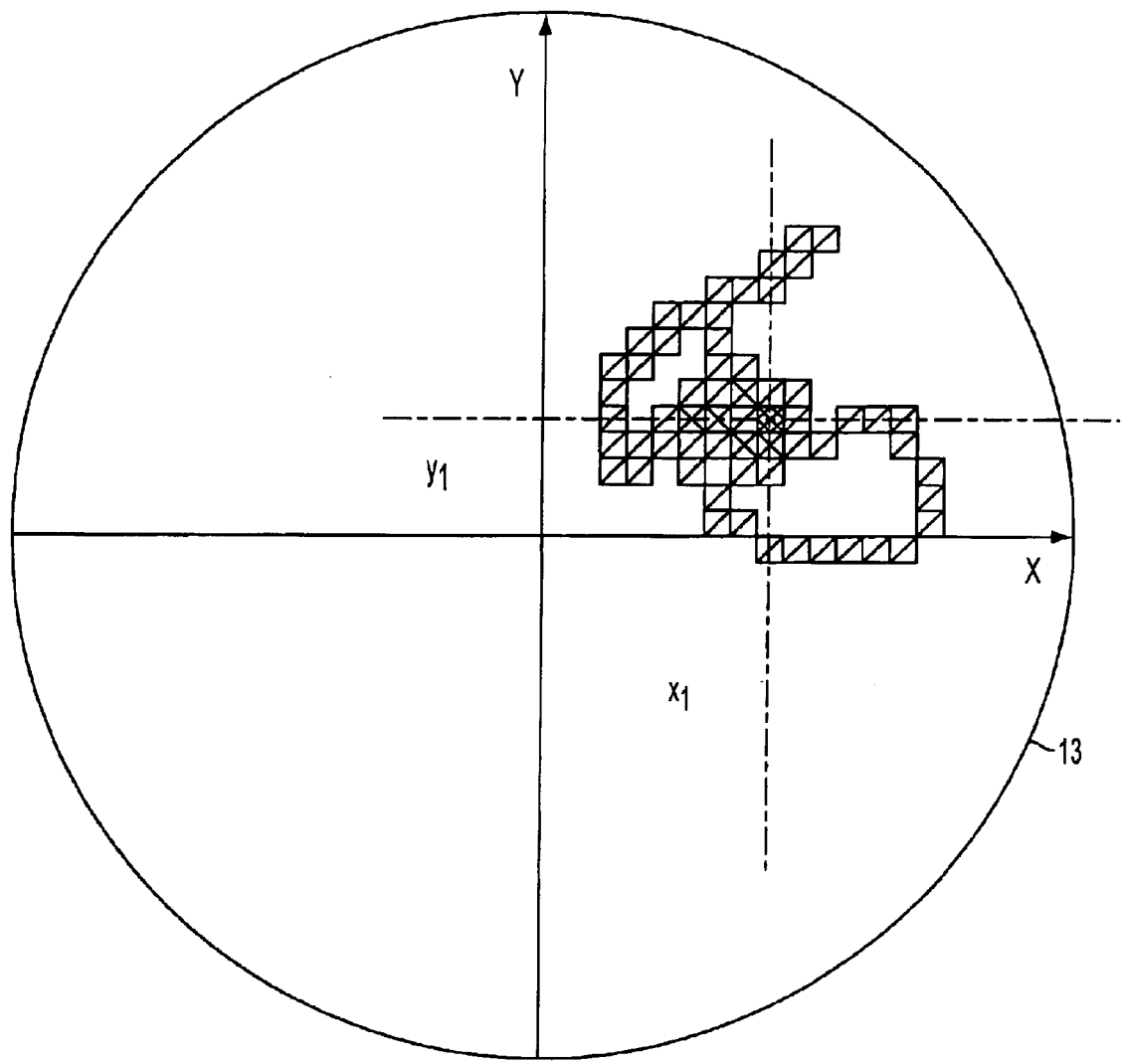
FIG. 5 shows the frequency of changes over X–Y coordinates of the specimen.

FIG. 5 shows the frequency movements in the X–Y plan over the specimen 10; the shape of the pixels is substantially the same as the two-dimensional depiction in FIG. 4. Regions experiencing higher frequency movements (i.e., regions through which the instrument's tip pass at a higher frequency) are depicted as darker histogram pixels. By way of example, with respect to FIG. 5, regions through which the instrument's tip passes one time are represented by pixels having a line travelling in one direction therethrough (i.e., a "/"). Regions through which the tip passes two times have an "X" therein. Finally, regions through which the tip passes four times are represented by a grid of lines. It should be recognized that the pixels in which a movement is indicated correspond directly to the path of the instrument's tip shown in FIGS. 2–4.

Figure 6:
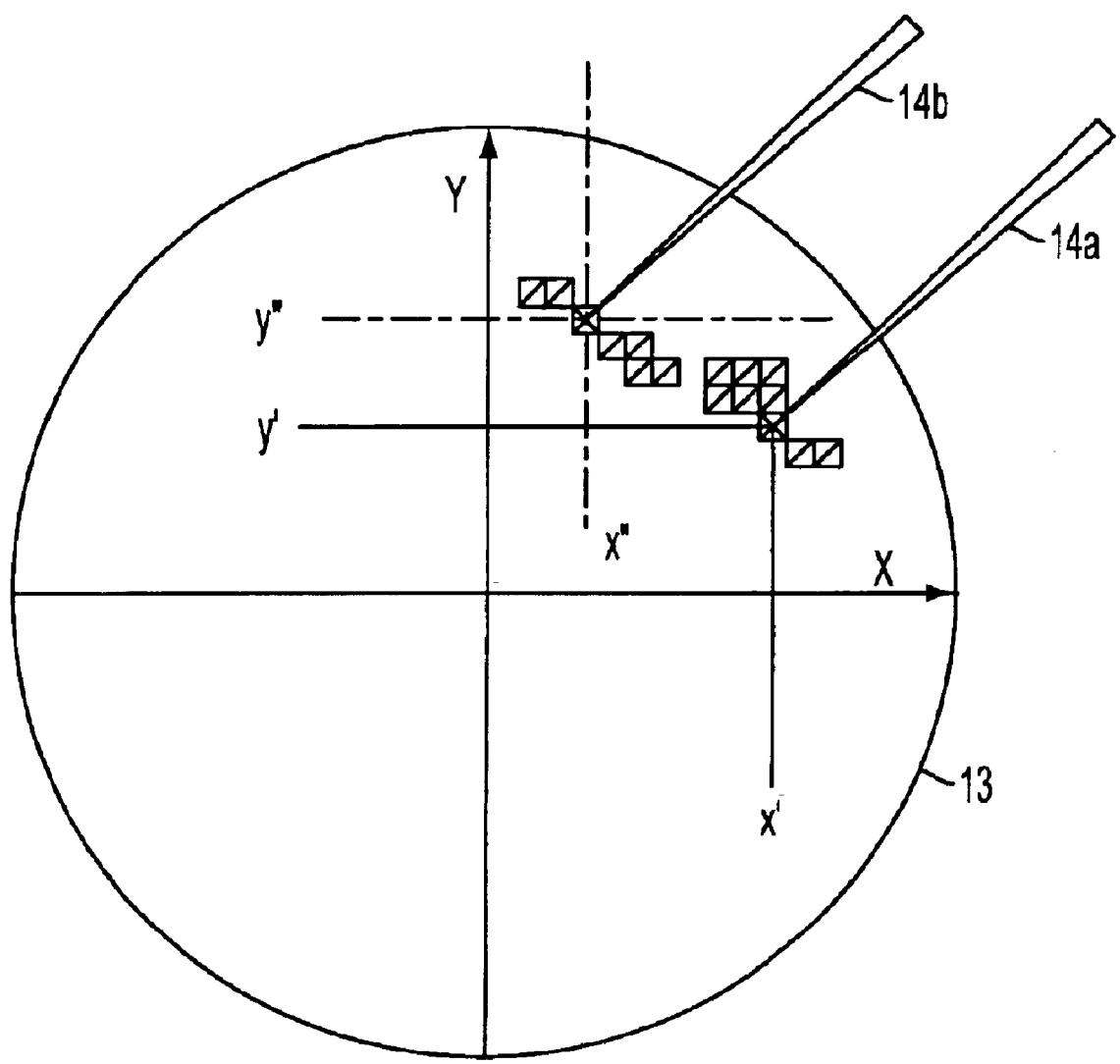
FIG. 6 shows a configuration in which two instruments are used as pointing instruments.

FIG. 6 shows a configuration in which two instruments 14a and 14b are used as pointing instruments. Also depicted is the relative movement of the two instruments 14a, 14b, as shown by the pixel coloration scheme according to FIG. 5. As a result of the dual movements 15a, 15b, the invention can be adapted to focus on two separate points (X', Y'), (X", Y"), at the choosing of the operator. The vertical spacing between the specimen 10 and the principal objective 5 can be changed to correspond to one or both of these separate points. Moreover, at the choosing of the operator, the vertical spacing could be changed so that both points are equally out of focus, i.e., so that the plane in the specimen 10 which is vertically equidistant between the two points would be in focus.

The apparatus previously described can be used to identify items moving within the image field 13 and/or to analyze images corresponding to the specimen 10. Moreover, by analyzing distinct regions of the specimen 10 in various images corresponding thereto, the apparatus can detect and categorize specimen-related changes such as, for example, fast and slow changes, brightness and/or occurrence of reflections. In addition, if multiple changes are detected, the apparatus can weight the changes to determine which change should be the target region.

Although the method and apparatus are particularly applicable to a surgeon and to a surgical microscope and a surgical field, the invention is not limited thereto, but rather is also open to other users of optical devices (e.g., video and still cameras, monocular as well as binocular applications). In addition, it will be apparent to those skilled in the art that various modifications and variations can be made to the disclosed preferred embodiments of the present invention without departing from the scope or spirit of the invention. Accordingly, it should be understood that the apparatus and method described herein are illustrative only and are not limiting upon the scope of the invention, which is indicated by the following claims.

What is claimed is:

1. A method for autofocusing the objective of an optical device onto a target region of a specimen, comprising the steps of:

(a) positioning the specimen defining a plurality of regions in an image field of the optical device;

(b) determining images changes for each of the plurality of regions of the specimen;

(c) defining as the target region the region among the plurality of regions of the specimen which exhibits a predetermined image change value;

(d) determining the vertical distance $Z_1$ between the objective and the target region;

(e) generating a first signal corresponding to the calculated distance $Z_1$;

(f) inputting the first signal into an autofocus system unit connected to a focusing device;

(g) activating the focusing device, in response to the first signal; and (h) focusing automatically the objective using the focusing device.

2. The method according to claim 1, further comprising the steps of:

(i) analyzing an image corresponding to the specimen for the evaluation of a first optically detectable specimen-related change.

3. The method according to claim 2, wherein the type of specimen-related change can be determined from the image, and wherein the method further comprises the step of:

(j) categorizing the specimen-related change into a category selected from the group consisting of fast and slow changes.

4. The method according to claim 2, wherein the type of specimen-related change can be determined from the image, and wherein the method further comprises the step of:

(j) categorizing the specimen-related change into a category selected from the group consisting of brightness and occurrence of reflections.

5. The method according to claim 2, further comprising the steps of:

(j) analyzing an image corresponding to the specimen for the evaluation of a second optically detectable specimen-related change; and (k) weighting each of said first and second optically detectable specimen-related changes to determine the target region.

6. The method according to claim 1, wherein the target region is the region among the plurality of regions of the specimen which exhibits the greatest number of image changes per unit time.

7. The method according to claim 1, wherein between steps (f) and (g), the method further comprises the steps of:

(f)(1) determining the vertical distance between the objective and a region on the specimen on which the objective is focused, said distance defining a second vertical distance;

(f)(2) generating a second signal corresponding to the second vertical distance;

(f)(3) inputting the second signal corresponding to the second vertical distance into the autofocus system unit; and (f)(4) comparing the second signal to the first signal to determine whether the second vertical distance is equal to the calculated vertical distance $Z_1$.

8. The method according to claim 7, wherein if the calculated vertical distance $Z_1$ and the second vertical distance are not equal, the method further comprises:

(f)(5) subtracting the calculated vertical distance $Z_1$ from the second vertical distance to define a difference.

9. The method according to claim 8, wherein if the difference is positive, the step (h) includes increasing the distance between the specimen and the objective.

10. The method according to claim 8, wherein if the difference is negative, the step (h) includes decreasing the distance between the specimen and the objective.

11. The method according to claim 1, further comprising the steps of:

(i) identifying objects moving within the image field.

12. The method according to claim 1, wherein the step (b) comprises the steps of:

(b)(1) resolving each of the plurality of regions of the specimen into a corresponding pixel having an X and Y coordinate;

(b)(2) generating, using an image sensor, first electrical signals corresponding to each of the pixels; and (b)(3) using the first electrical signals corresponding to the pixels to generate a first image representation of the specimen.

13. The method according to claim 12, wherein the first electrical signals corresponding to the pixels are video signals.

14. The method according to claim 12, further comprising the steps of:

(b)(4) generating, using the image sensor, second electrical signals corresponding to each of the pixels;

(b)(5) using the second electrical signals corresponding to the pixels to generate a second image representation of the specimen; and (b)(6) comparing, for each pixel, the second electrical signal to the first electrical signal to define the image changes of the region of the specimen corresponding to the pixel.

15. The method according to claim 14, further comprising the step of:

(b)(7) displaying the image changes of each of the pixels in a visual output.

16. The method according to claim 15, wherein the visual output is a three-dimensional histogram having X, Y, and Z coordinates.

17. The method according to claim 16, wherein the X and Y coordinates of the histogram correspond to the X and Y coordinates of the pixels, respectively, and wherein the Z coordinate of the histogram corresponds to the image changes at each of the pixels.

18. The method according to claim 17, wherein the pixel having the greatest number of image changes is the target region.

19. An apparatus for automatically focusing an optical system comprising:
- an image sensor analysis unit;
- an autofocus system unit;
- a focusing device; and
- a displaceable objective,
- wherein the objective is adapted to be automatically moved vertically in response to a signal corresponding to a vertical height between a target region of a specimen and a reference point,
- wherein the image sensor analysis unit is adapted to send a signal to the autofocus system unit corresponding to the vertical height of the target region,
- wherein the autofocus system unit is adapted to measure a focus height,
- wherein the autofocus system unit is adapted to compare the focus height to the vertical height between the target region and the reference point and yield an output corresponding to said comparison,
- wherein the focusing device is adapted to move the objective vertically in response to the output of the autofocus system unit, and
- wherein the image sensor analysis unit is adapted to detect image changes in distinct regions of the specimen over time.

20. The apparatus according to claim 19, wherein the image sensor analysis unit is a computer.

21. The apparatus according to claim 20, wherein the computer is adapted to detect changes in electrical signals corresponding to the image changes in the distinct regions of the specimen.

22. The apparatus according to claim 21, wherein the computer is further adapted to analyze the changes.

23. An apparatus for automatically focusing an optical system comprising:
- an image sensor analysis unit;
- an autofocus system unit;
- a focusing device; and
- a displaceable objective,
- wherein the objective is adapted to be automatically moved along an optical axis of the objective in response to a signal corresponding along the optical axis of the objective to a distance between a target region of a specimen and a reference point, and
- wherein the image sensor analysis unit is adapted to detect image changes in distinct regions of the specimen over time.

24. The apparatus according to claim 23, wherein the image sensor analysis unit is adapted to send a signal to the autofocus system unit corresponding to the distance of the target region.

25. The apparatus according to claim 24, wherein the autofocus system unit is adapted to measure a focus height, and wherein the autofocus system unit is adapted to compare the focus height to the distance between the target region and the reference point and yield an output corresponding to said comparison.

26. The apparatus according to claim 25, wherein the focusing device is adapted to move the objective in response to the output of the autofocus system unit.

27. The apparatus according to claim 23, wherein the image sensor analysis unit is a computer.

28. The apparatus according to claim 27, wherein the computer is adapted to detect changes in electrical signals corresponding to distinct regions of the specimen.

29. The apparatus according to claim 28, wherein the computer is further adapted to analyze the changes.

* * * * *